US012771458B2

(12) United States Patent
Smith et al.

(10) Patent No.: US 12,771,458 B2
(45) Date of Patent: Oct. 20, 2026

(54) WAVELENGTH DIVISION MULTIPLEXING (WDM) OPTICAL INTERCONNECT

(71) Applicant: 4S-Silversword Software and Services, LLC, Catonsville, MD (US)

(72) Inventors: Ronald H Smith, Catonsville, MD (US); William Robert Allen Ziegler, Catonsville, MD (US); Stephen Roberson, Catonsville, MD (US); James Sutherland, Catonsville, MD (US); Kelli Boyer, Catonsville, MD (US); Christian Lawson, Catonsville, MD (US)

(73) Assignee: Ronald Smith, Rockville, MD (US)

( * ) Notice: Subject to any disclaimer, the term of this patent is extended or adjusted under 35 U.S.C. 154(b) by 0 days.

(21) Appl. No.: 19/209,718

(22) Filed: May 15, 2025

(65) Prior Publication Data

US 2025/0358017 A1 Nov. 20, 2025

Related U.S. Application Data

(60) Provisional application No. 63/648,040, filed on May 15, 2024.

(51) Int. Cl.
*H04B 10/80* (2013.01)
*H04B 10/27* (2013.01)
*H04J 14/02* (2006.01)

(52) U.S. Cl.
CPC ........... *H04B 10/801* (2013.01); *H04B 10/27* (2013.01); *H04J 14/02* (2013.01)

(58) Field of Classification Search
CPC ........ H04B 10/801; H04B 10/27; H04J 14/02
USPC ........................................................... 398/79
See application file for complete search history.

(56) References Cited

U.S. PATENT DOCUMENTS 11,320,588 B1 * 5/2022 Mazed .................. G06N 10/40
2009/0047019 A1 * 2/2009 Palacharla .......... H04J 14/0205 398/59
2010/0054655 A1 * 3/2010 Glebov ............. H04Q 11/0005 385/9
2017/0139145 A1 * 5/2017 Heanue ............... G02B 6/4292
(Continued)

*Primary Examiner* — Dalzid E Singh
(74) *Attorney, Agent, or Firm* — Tariq S. Najee-Ullah; GIBRALTAR CONSULTING LLC

(57) ABSTRACT

A wavelength division multiplexing (WDM) optical interconnect system may comprise a frequency comb generator configured to generate multiple optical wavelengths. A demultiplexing optical spectrometer may separate the multiple optical wavelengths. A processor chip may comprise a plurality of optical waveguides and modulators. The optical waveguides may direct individual optical signals to the modulators. The modulators may be internal to and integral with the processor chip. Output waveguides may direct modulated optical signals to separate networked devices. The modulators may be arranged in a three-dimensional array within the processor chip. The demultiplexing optical spectrometer may comprise an input for receiving optical signals, a collimating lens, a diffraction grating, and an output focusing lens. The input for receiving optical signals may be arranged in a two-dimensional array. The diffraction grating may direct multiplexed wavelengths embedded in each input optical signal to a linear array of single-wavelength optical signals.

18 Claims, 7 Drawing Sheets

*Figure 6 Mach-Zehnder modulators internal to chip*

(56) References Cited

U.S. PATENT DOCUMENTS

| | | | | |
|---|---|---|---|---|
| 2017/0272845 | A1* | 9/2017 | Pezeshki | H04B 10/503 |
| 2019/0342010 | A1* | 11/2019 | Evans | H04B 10/503 |
| 2020/0162184 | A1* | 5/2020 | Barbarossa | H04J 14/0256 |
| 2024/0195510 | A1* | 6/2024 | Timurdogan | H04B 10/5161 |
| 2025/0141587 | A1* | 5/2025 | Vaithianathan | G06F 13/20 |

* cited by examiner

*Figure 1: Dense DWDM optical backplane concept*

*Figure 2: Broadband optical interface diagram*

*Figure 3 Hub and spoke network topology*

400

Interconnect table

Key
S = shown in diagram
P = present but not shown

| From | To 1 | 2 | 3 | 4 |
|---|---|---|---|---|
| 1 | | S | S | S |
| 2 | S | | P | P |
| 3 | S | P | | P |
| 4 | S | P | P | |

*Figure 4 Mesh network topology*

*Figure 5 Mesh core with multi-stage spoke expansion*

600

*Figure 6 Mach-Zehnder modulators internal to chip*

700

*Figure 7: Mach-Zehnder traveling wave optical signal modulator block diagram*

WAVELENGTH DIVISION MULTIPLEXING (WDM) OPTICAL INTERCONNECT

CROSS-REFERENCE TO RELATED APPLICATIONS

This application claims the benefit of U.S. Provisional Patent Application No. 63/648,040, filed May 15, 2024, the entire contents of which are hereby incorporated by reference.

FIELD

The present disclosure relates generally to optical communication systems, and more particularly to wavelength division multiplexing (WDM) optical interconnect systems for high-bandwidth computing networks.

BACKGROUND

Modern computing environments, particularly data centers and high-performance computing systems, face increasing demands for higher bandwidth, lower latency, and greater energy efficiency in their interconnection networks. Traditional copper-based interconnects face fundamental limitations in bandwidth, distance, and power consumption as data rates continue to scale.

Optical interconnects offer advantages in bandwidth, distance capability, and energy efficiency compared to their electrical counterparts. However, existing optical interconnect solutions typically interface with processor chips only at their edges, limiting the potential bandwidth and scalability of such systems.

Wavelength division multiplexing (WDM) technology enables multiple optical signals of different wavelengths to be transmitted simultaneously over a single optical fiber, significantly increasing the bandwidth capacity. Recent advances in frequency comb generation and optical modulation technologies have created new possibilities for implementing highly parallel optical interconnects.

The information disclosed in this background section is provided for contextual purposes only and should not be construed as limiting the scope of the present disclosure in any way.

SUMMARY

The following presents a simplified summary of the disclosure in order to provide a basic understanding of some aspects of the disclosure. This summary is not an extensive overview of the disclosure. It is not intended to identify key or critical elements of the disclosure or to delineate the scope of the disclosure. The following summary merely presents some concepts of the disclosure in a simplified form as a prelude to the more detailed description provided below.

In accordance with one or more aspects of the present disclosure, a wavelength division multiplexing (WDM) optical interconnect system may include an optical comb frequency generator, a frequency comb input optical spectrometer, optical waveguides and modulators internal to a processor chip, a computer processor embedded in the chip, a detector array spectrometer, and optical fiber cables connecting separate networked processors.

The optical interconnect system may address optical signals inside processor chips for modulation and processing, rather than limiting optical interfaces to chip edges. A two-dimensional optical array created by the spectrometer may enable massively parallel data transmission between processors in a network.

The system may support various network topologies, including hub-and-spoke configurations, mesh networks, and multi-stage expansion architectures, enabling scalable, high-bandwidth computing networks with significantly improved energy efficiency compared to conventional electrical interconnects.

The present disclosure is not limited to the specifically disclosed embodiments, and variations and modifications may be made without departing from the scope of the present disclosure.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

Various aspects of the present disclosure may be described with reference to specific configurations, components, or arrangements. However, it should be understood that such descriptions are merely illustrative and not restrictive. The present disclosure may be practiced in many different forms and should not be construed as being limited to the specific embodiments set forth herein. In particular, the present disclosure may be practiced with various modifications and alternatives as would be apparent to those skilled in the art.

Furthermore, the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order and are not meant to be limited to the specific order or hierarchy presented.

As used herein, the term "coupled" may refer to any connection, coupling, link, or the like by which signals produced by one system element are imparted to another "coupled" element. Such connections, couplings, links, etc., may be direct or indirect, and may be electrical, mechanical, optical, or the like.

The present disclosure describes a wavelength division multiplexing (WDM) optical interconnect system that provides massively parallel optical fiber input/output to and from processor chips, enabling large-scale computing networks. The system uses a novel approach to integrate optical signal processing within computer processor chips, utilizing a two-dimensional optical array created through spectrometer-based demultiplexing of frequency combs.

Optical Interconnect System Overview

Figure 1:
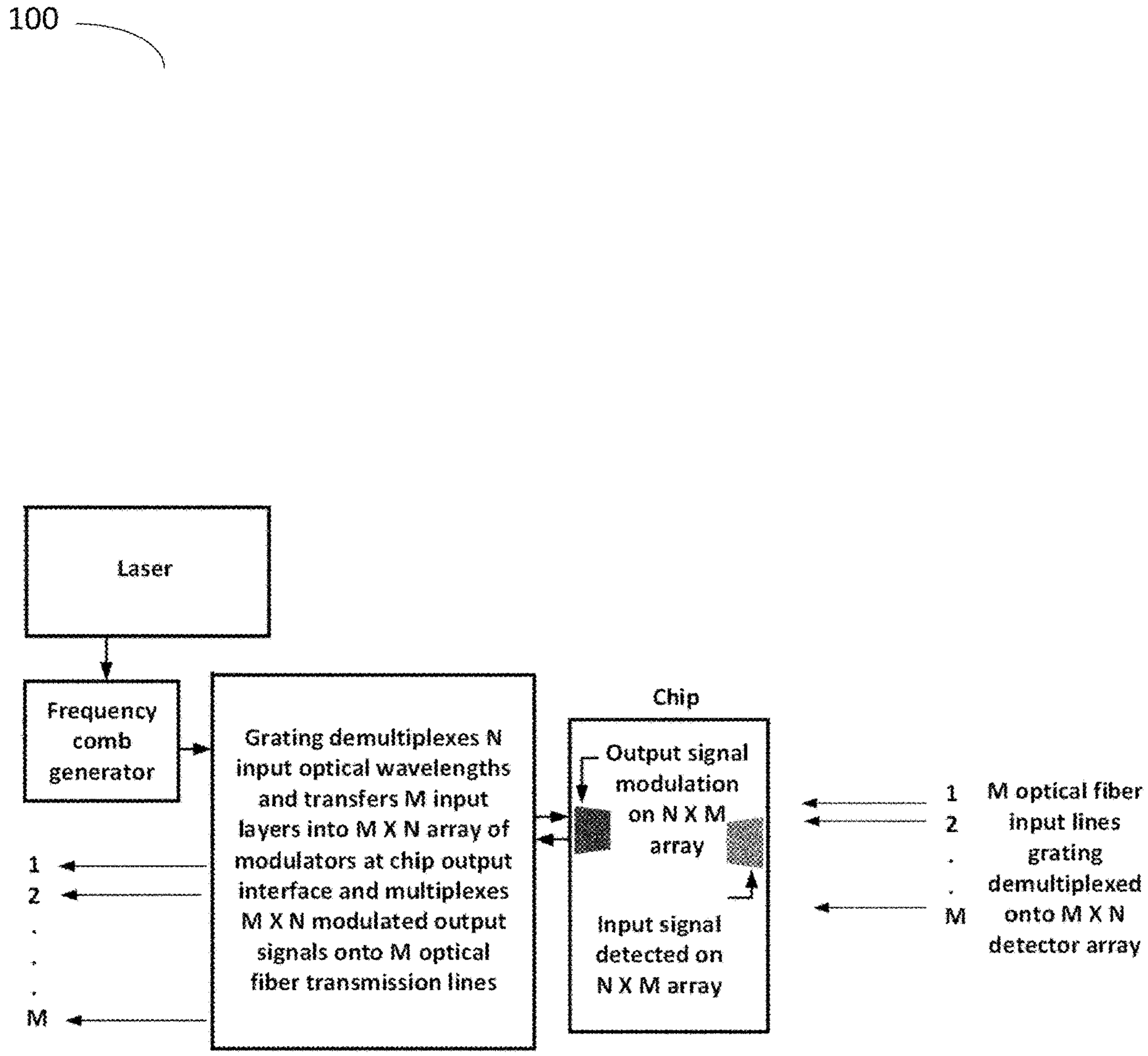
FIG. 1 illustrates a dense DWDM optical transceiver according to one or more aspects of the present disclosure.

FIG. 1 illustrates a dense DWDM optical transceiver according to one or more aspects of the present disclosure. The system may include a laser that feeds into a frequency comb generator. The frequency comb generator may produce multiple evenly spaced wavelengths that serve as carriers for data transmission. Output from the frequency comb generator may be directed through a grating spectrometer that demultiplexes the combined wavelengths.

The grating spectrometer may demultiplex N input optical wavelengths and transfer M input layers for an M×N array of optical wave ports at a chip output interface. The spectrometer may also multiplex M×N modulated optical signals onto M optical fiber transmission lines. Within the chip, output signals may be modulated on an M×N array, and input signals from external signal sources may be detected on an M×N array.

This approach may replace short-reach copper cables with optical signal interconnects, providing quick routing capabilities to overcome latency and connectivity issues in modern data centers. The system may be further adapted to future network architectures having scalability well beyond those presently in the state of the art.

Broadband Optical Interface

Figure 2:
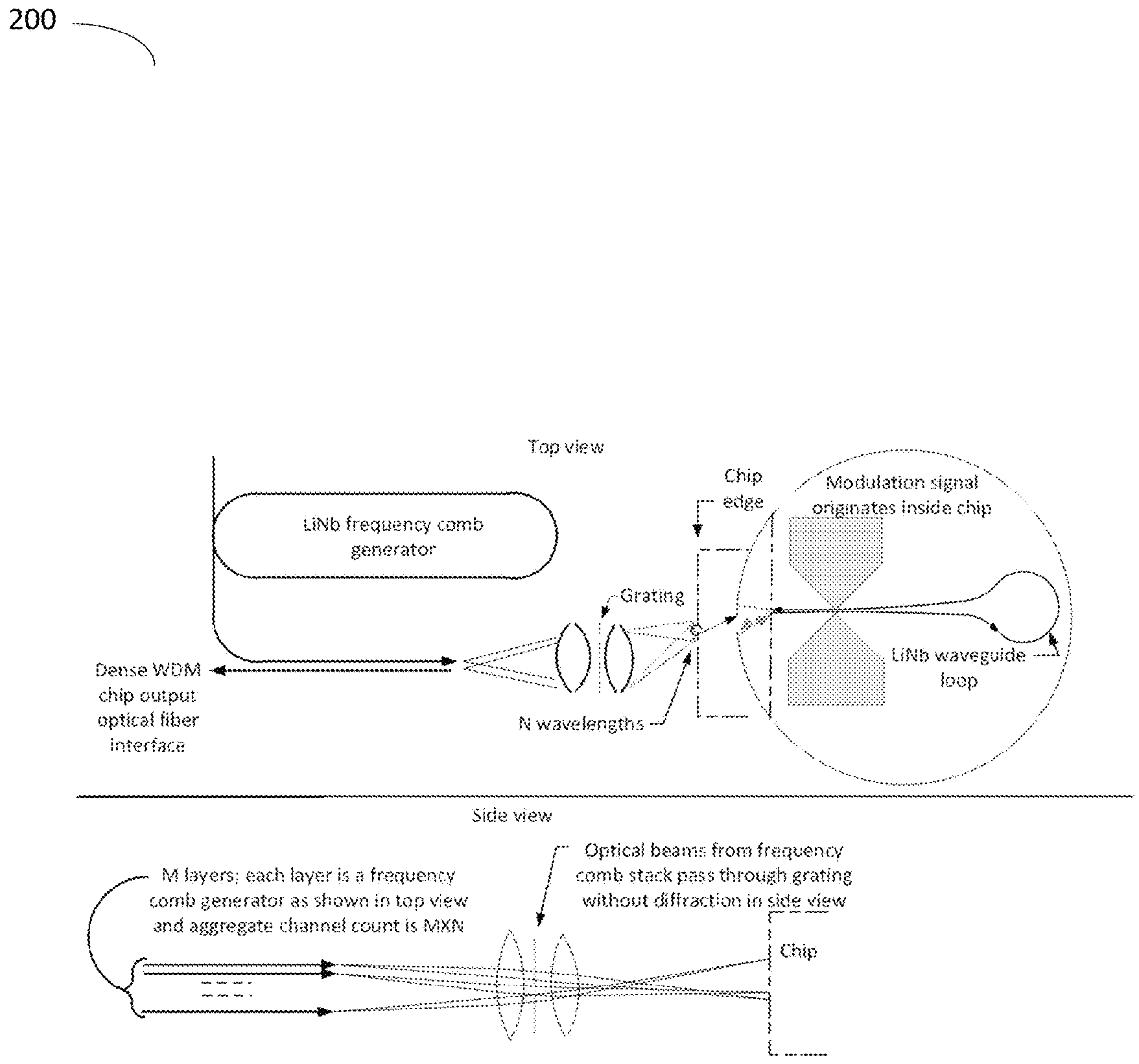
FIG. 2 illustrates a broadband optical interface diagram according to one or more aspects of the present disclosure.

FIG. 2 illustrates a broadband optical interface diagram according to one or more aspects of the present disclosure. As shown in the top view, output from a frequency comb generator, which may be a Lithium Niobate (LiNb) frequency comb generator, may be directed through a grating spectrometer which images individual comb wavelengths onto an array of modulator waveguide loops. The modulation signal may originate inside the chip.

Output from these loops may be routed back through the grating spectrometer to output optical fibers that carry signals on each of N wavelengths. For example, if each wavelength carries a 25 Gbps signal and N=40, the aggregate bandwidth may be 1,000 Gbps. The invention may be scalable well beyond 1,000 Gbps.

As shown in the side view in FIG. 2, a grating spectrometer may accept parallel input from M optical fibers (or layers) and image N wavelengths onto an M×N array of modulator waveguide interfaces. Each layer may be a frequency comb generator as shown in the top view, and the aggregate channel count may be M×N. For example, if M=100, N=40, and per channel modulation rate is 25 Gbps, the aggregate throughput may be 100 Tbps. If M=100, N=160, and per channel modulation rate is 25 Gbps, the aggregate throughput may be 400 Tbps.

FIG. 2 also shows optical beams from the frequency comb stack passing through the grating without diffraction in the side view. This arrangement may allow for the massive parallelization of optical channels through a three-dimensional array of modulators.

Modulator Configurations

FIG. 2 shows a LiNb waveguide loop inside the chip returning to a point close to the waveguide entry point and retracing the optical path through the original grating spectrometer. An alternative may be to run the waveguide in a single pass through the modulator, then around to a separate location on the chip and out through a second grating spectrometer to the output fiber.

Figure 6:
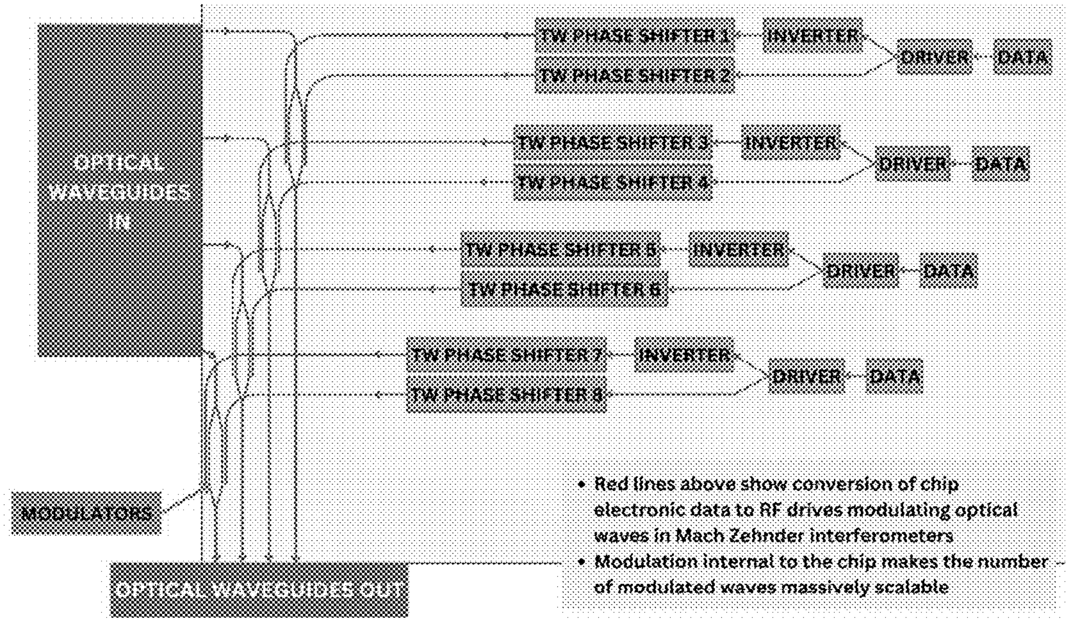
FIG. 6 illustrates Mach-Zehnder modulators integrated in a chip according to one or more aspects of the present disclosure.

FIG. 6 illustrates Mach-Zehnder modulators integrated in a chip according to one or more aspects of the present disclosure. The figure shows optical waveguides incorporated with modulators, with several traveling wave (TW) phase shifters linked with inverters, drivers, and data paths. Red lines show conversion of chip electronic data to RF drivers modulating optical waves in Mach-Zehnder interferometers.

Figure 7:
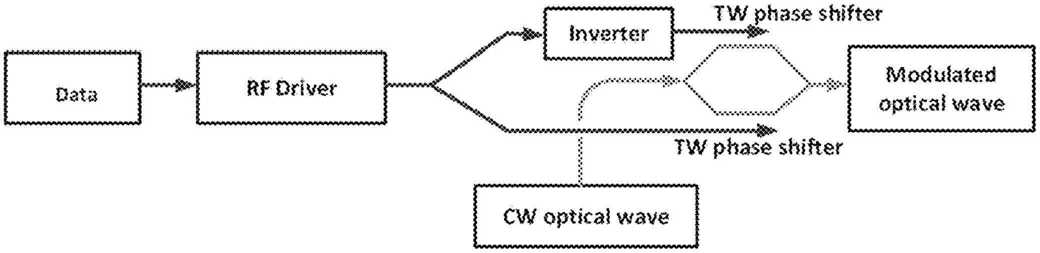
FIG. 7 illustrates a Mach-Zehnder traveling wave optical signal modulator block diagram according to one or more aspects of the present disclosure.

FIG. 7 illustrates a Mach-Zehnder traveling wave optical signal modulator block diagram. Output data (shown in red) may be directed to an RF driver and split. The top branch may be inverted and directed to an RF traveling wave running parallel to the top optical waveguide. The bottom branch may be an RF traveling wave running parallel to the bottom optical waveguide. The two RF traveling waves may impose opposite phase changes in the optical waves they abut, resulting in the desired optical wave signal modulation.

A first objective of internal modulator placement may be to make the high frequency RF lines inside the chip as short as possible. Short RF lines may provide several benefits: bandwidth retention and crosstalk reduction may be improved with shorter lines, and the thermal load associated with current-carrying metal conductors internal to the chip may be minimized.

A second objective may be to minimize the volume occupied by the modulators; a goal may be 1 $mm^2$ per modulator. When this is achieved, 16,000 modulators may fit in a chip volume that is a 50 mm square and 20 mm high when 30% of the chip volume is devoted to modulation. A first alternative small footprint modulator may be based on resonant microdisk technology. A second alternative small footprint modulator may be based on electro-absorption technology.

Frequency Comb Generation and Demultiplexing

Demultiplexing a single frequency comb wave into 160 single wavelength outputs may be achieved, for example, by starting with a frequency comb generator having dense frequency output, directing the comb output to one or more stages of Mach-Zehnder interferometers that separate alternate frequencies into separate output waveguides, and directing these output waveguides in a line parallel to the demultiplexed grating spectrometer output line. This parallel alignment may result in all of the original comb frequencies output in a single line into modulator waveguide ports.

In a two-dimensional array example with a 160 column by 100 row waveguide entrance array, the 100 rows may be generated by directing 100 frequency comb generator outputs in a row orientation to the spectrometer input. It is noteworthy that 16,000 optical inputs may be accommodated by a 160 by 100 entrance waveguide array with 20 micrometer pitch and 3.2 mm by 2 mm dimensions. An image field this size may be very nearly on axis for a 50 mm focal length spectrometer lens.

Network Topologies

Figure 3:
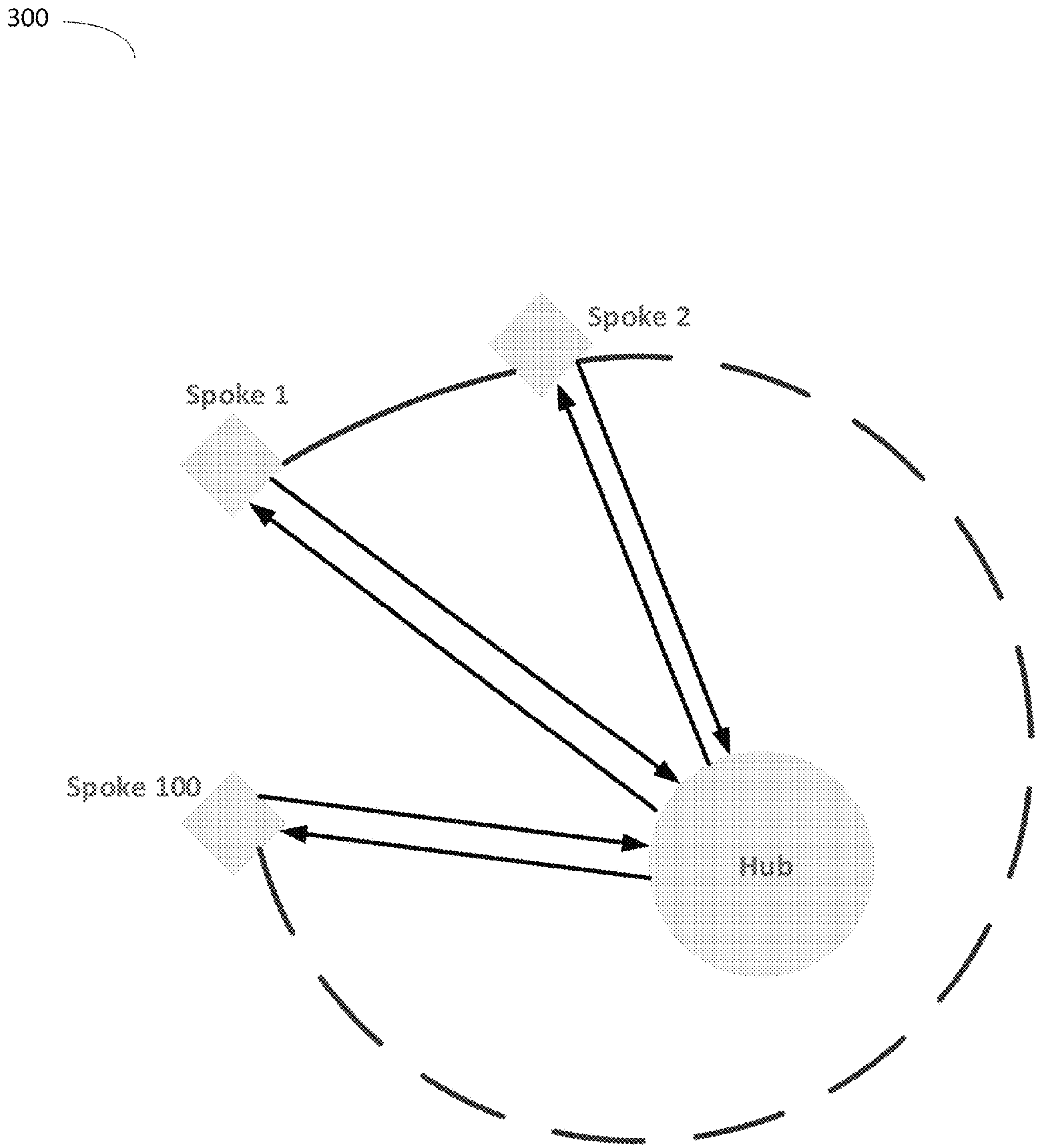
FIG. 3 illustrates a hub and spoke network topology according to one or more aspects of the present disclosure.

The optical interface technology may support several network topologies, including:

FIG. 3 illustrates a hub and spoke network topology according to one or more aspects of the present disclosure. In this configuration, the optical broadband channel count may provide simultaneous bidirectional non-blocking broadband interconnection from the hub to all of the spokes.

Figure 4:
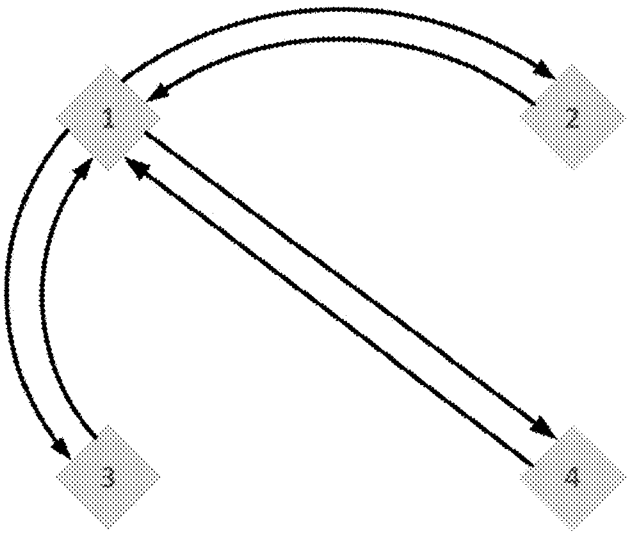
FIG. 4 illustrates a mesh network topology according to one or more aspects of the present disclosure.

FIG. 4 illustrates a mesh network topology according to one or more aspects of the present disclosure. In this configuration, M−1 optical fibers output from each node may connect M nodes in a ring, with each node having direct non-blocking broadband connection to all of the other mesh nodes. The mesh topology may provide maximum I/O data transfer rate among cooperating processors.

Figure 5:
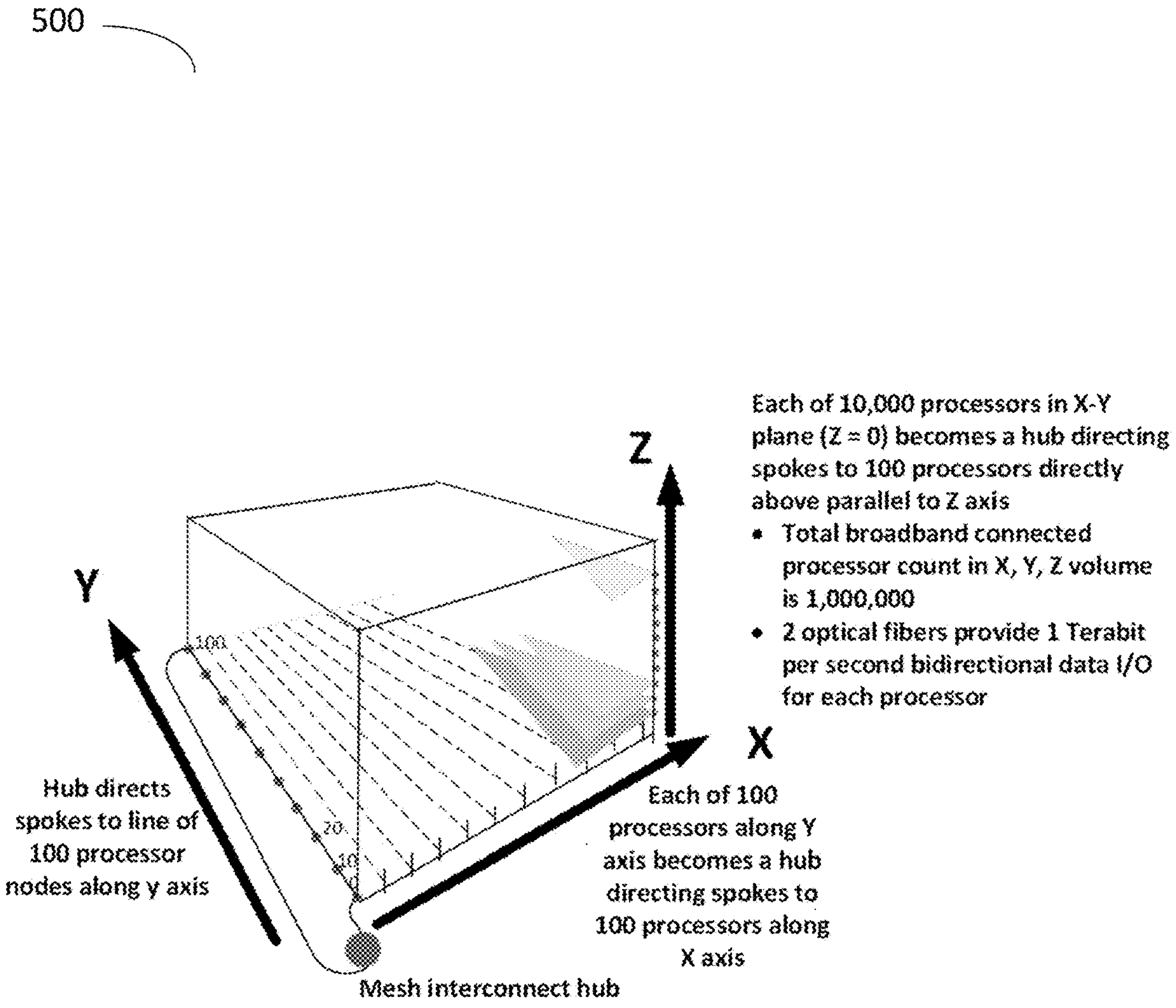
FIG. 5 illustrates a mesh core with multi-stage spoke expansion according to one or more aspects of the present disclosure.

FIG. 5 illustrates a mesh core with multi-stage spoke expansion according to one or more aspects of the present disclosure. Networks configured in this way may scale to many cooperating nodes in a supercomputer that is freed from the thermal constraints of electronic interconnects while providing maximum system flexibility and high aggregate tightly coupled computation power. Additionally, individual processor functions may include re-routing electronic signals in a chip resulting in reconfiguration of the network signal transmission configuration.

As shown in FIG. 5, each of 10,000 processors in the X-Y plane (Z=0) may become a hub directing spokes to 100 processors directly above parallel to the Z axis. The total broadband connected processor count in the X, Y, Z volume may be 1,000,000. Two optical fibers may provide 1 Terabit per second bidirectional data I/O for each processor. Each of 100 processors along the Y axis may become a hub directing spokes to 100 processors along the X axis.

System Components

The wavelength division multiplexing (WDM) optical interconnect system may include the following key components:

Optical Comb Frequency Generator with Laser Input

The optical comb frequency generator may be located externally to the processor chip and may generate unmodulated optical signals across an array of wavelengths, creating a frequency comb that serves as the foundation for parallel data transmission. The frequency comb generator may incorporate functionality for selecting alternate wavelengths in a source comb, then directing separated comb output fibers to the spectrometer input.

The frequency comb generator may utilize various material systems, such as Lithium Niobate (LN) or $Si_3N_4$, to produce the comb of optical wavelengths. The generated wavelengths may be evenly spaced and may serve as carriers for data transmission.

Frequency Comb Input Optical Spectrometer

The frequency comb input optical spectrometer may demultiplex optical fiber signals from the frequency comb generator and project specific signal streams internally to an output port of the spectrometer, creating a two-dimensional optical array.

The spectrometer may include an input collimating lens, a diffraction grating, and an output focusing lens. Alternatively, the spectrometer may employ an Offner configuration with input curved reflecting mirror, grating, and output curved reflecting mirror.

The spectrometer may accept parallel input from M optical fibers and image N wavelengths onto an M×N array of modulator waveguide interfaces. The spectrometer may maintain spatial separation of at least 10 microns between optical signals to prevent crosstalk.

Processor Chip Integration

The processor chip may contain optical waveguides and modulators that receive the demultiplexed optical signals. The waveguides may have cross-section dimensions substantially smaller than the cross-section dimension of a modulator internal to the chip. This may allow the number of waveguides accessible on any surface area of the chip to be comparable to the number of modulators contained in a three-dimensional array in the body of the chip.

The modulators may be implemented as Lithium Niobate (LN) modulator loops, Mach-Zehnder Traveling Wave (TW) modulators, resonant microdisk modulators, or electro-absorption modulators. The modulators may be integrated within and integral to the semiconductor processor chip.

The processor chip may also include a computer processor core that generates electronic signals and control circuitry that drives the optical modulators based on desired signal transmission destinations. The chip may include thermal management components to handle heat generated by optical-electronic conversions.

Detector Array Spectrometer

The detector array spectrometer may be located adjacent to the chip and may demultiplex input optical signals from optical fibers connected to other processors in the network. The detector array may convert optical signals to electronic signals that can be processed by the chip.

Real-Time Signal Routing Reconfiguration Capabilities

The present disclosure may provide for real-time reconfiguration of signal routing among networked devices through the internal rerouting of electronic signals by individual processors. This capability may offer significant advantages in dynamic network environments where communication patterns frequently change based on computational demands or system conditions.

Internal Signal Routing Architecture

The internal signal routing architecture is provided as follows according to one or more aspects of the present disclosure. Within each processor chip, a signal routing control unit may be implemented that dynamically configures the connections between the electronic processor core and the optical modulator array. This control unit may include a routing table that maps destination addresses to specific modulators corresponding to particular wavelengths and output fibers.

The signal routing control unit may receive input from the processor regarding desired communication paths and may translate these requirements into specific modulator activations. When a processor needs to reconfigure its communication pathways, it may update its internal routing table and redirect electronic signals to different modulators within the chip, effectively changing the destination of optical signals without requiring physical reconfiguration of the network.

Each processor chip may include a crossbar switch matrix that may connect any of the processor's data channels to any of the optical modulators in the three-dimensional array. This crossbar architecture may allow for complete flexibility in routing, enabling any-to-any connectivity within the constraints of the available optical channels. The crossbar switch may be implemented using high-speed electronic switches that may operate at data rates compatible with the optical modulators.

Dynamic Bandwidth Allocation

The real-time reconfiguration capability may enable dynamic bandwidth allocation based on application needs. Processors may allocate more wavelength channels to communication paths experiencing heavy traffic and fewer channels to paths with lighter loads. This adaptive bandwidth allocation may be performed through internal electronic signal rerouting without changes to the physical network configuration.

A dynamic bandwidth allocation scheme is provided as follows according to one or more aspects of the present disclosure. The figure shows how a processor may redistribute its available modulator resources in response to changing traffic patterns. Initially, the processor may allocate equal numbers of modulators to each destination. When traffic patterns change, the processor may internally reroute electronic signals to assign more modulators to high-traffic destinations and fewer to low-traffic destinations.

The dynamic bandwidth allocation may be implemented through a bandwidth manager component within the signal routing control unit. This component may monitor communication traffic patterns and may make recommendations for bandwidth reallocation based on observed usage patterns. The processor may then implement these recommendations by rerouting electronic signals to different sets of modulators.

Fault Tolerance Through Rerouting

The ability to reroute electronic signals internally may also provide enhanced fault tolerance for the optical interconnect system. If a particular modulator, wavelength channel, or fiber path experiences a failure, the affected processors may reconfigure their internal routing to avoid the failed component.

A fault recovery scenario is provided as follows according to one or more aspects of the present disclosure. When a processor detects a failed optical path, it may update its routing table to redirect traffic intended for that path to alternative functional paths. This rerouting may occur entirely through internal electronic signal redirection, without requiring physical intervention in the network.

The fault detection and recovery process may include several steps. First, the processor may detect a communication failure through timeout mechanisms or explicit fault notifications from network monitoring systems. Next, the processor may identify alternative routing options based on its knowledge of the network topology and available resources. Finally, the processor may update its internal routing tables to implement the new routing strategy.

Network Topology Reconfiguration

The real-time signal rerouting capability may enable dynamic reconfiguration of the logical network topology without changes to the physical connections. Processors may establish or tear down logical connections by activating or deactivating specific modulators corresponding to particular destination paths.

A network topology reconfiguration example is provided as follows according to one or more aspects of the present disclosure. In this example, a mesh network may be temporarily reconfigured into a hub-and-spoke topology by having certain processors reroute their electronic signals to establish the desired logical connections. Later, the network may be returned to a mesh configuration through another round of internal signal rerouting.

The topology reconfiguration may be coordinated across multiple processors through a distributed control protocol. Each processor may exchange topology information with its neighbors and may make local routing decisions that collectively implement the desired global topology. This distributed approach may avoid the need for a central controller and may provide greater resilience to failures.

Quality of Service Management

The internal signal rerouting capability may support quality of service (QoS) management by allowing processors to prioritize certain types of traffic over others. Critical communications may be routed through dedicated wavelength channels, while less time-sensitive traffic may be routed through shared channels.

A QoS management scheme is provided as follows according to one or more aspects of the present disclosure. The processor may maintain multiple routing tables corresponding to different traffic priority levels. High-priority traffic may be routed through dedicated, low-latency paths, while lower-priority traffic may be routed through shared paths that may experience higher latency during congestion.

The QoS management may be implemented through a traffic classifier component within the signal routing control unit. This component may analyze outgoing data packets and may assign them to appropriate priority queues based on packet headers or application-provided metadata. The routing decision for each packet may then be made based on its assigned priority level.

Implementation Considerations

The real-time reconfiguration of signal routing may be implemented through programmable logic within the processor chip. Field-programmable gate arrays (FPGAs) or application-specific integrated circuits (ASICs) may be used to implement the crossbar switch and routing control logic. These components may be tightly integrated with the processor core and optical modulator array to minimize latency in the routing decision process.

The routing control logic may operate at multiple timescales. Fast path switching may occur on nanosecond timescales to handle packet-by-packet routing decisions. Slower reconfiguration operations, such as bandwidth reallocation or topology changes, may occur on millisecond to second timescales in response to observed traffic patterns or explicit reconfiguration commands.

The routing control system may include a monitoring subsystem that continuously evaluates the performance of the optical interconnect. This subsystem may track metrics such as channel utilization, error rates, and latency for each optical path. The collected metrics may be used to inform routing decisions and may trigger automatic reconfiguration when performance falls below specified thresholds.

Security Considerations

The ability to dynamically reconfigure signal routing may also have security implications. The routing control system may include security features to prevent unauthorized reconfiguration of communication paths. These features may include authentication mechanisms for reconfiguration commands, encryption of routing table updates, and logging of all routing changes for audit purposes.

A secure routing reconfiguration protocol is provided as follows according to one or more aspects of the present disclosure. Before implementing a routing change, the processor may verify that the change request comes from an authorized source and may ensure that the requested configuration does not violate any security policies. The processor may also notify network management systems of the change for monitoring and audit purposes.

The security mechanisms may be implemented through a secure enclave within the processor chip. This enclave may store cryptographic keys and may perform authentication operations for routing reconfiguration requests. The enclave may be isolated from the main processor to protect it from potential compromise of the general-purpose computing environment.

Integration with Network Management Systems

The real-time signal routing capabilities may be integrated with higher-level network management systems to enable coordinated reconfiguration across multiple processors. The processors may expose APIs that allow network management software to query current routing configurations and to request specific routing changes.

The integration between processor-level routing control and network-level management is provided as follows according to one or more aspects of the present disclosure. Network management software may collect routing information from all processors in the network and may issue coordinated reconfiguration commands to implement network-wide policy changes.

The integration may be implemented through a management agent running on each processor. This agent may communicate with the routing control logic to retrieve current configurations and to implement requested changes. The agent may also report routing performance metrics to the network management system to inform global optimization decisions.

Optical Fiber Network

Optical fiber cables may connect multiple processor chips, carrying multiplexed optical signals between processors in the network. Each fiber may carry multiple wavelengths (dense WDM), supporting broadband data flow. Bidirectional data flow is accomplished using optical fiber pairs in a cable bundle.

Alternative implementations may use free-space optics for increased mobility, where the optical waves pass between optical spectrometers and networked devices connected to the system.

System Operation

In operation, the WDM optical interconnect system may function as follows:

1. The optical comb frequency generator may produce multiple evenly spaced wavelengths that serve as carriers for data transmission.
2. The frequency comb input optical spectrometer may demultiplex the wavelengths from the frequency comb and project them onto a two-dimensional array format.
3. The demultiplexed wavelengths may be directed to optical waveguides that route them to modulators within the processor chip.
4. The processor chip may generate electronic signals representing data to be transmitted and drive the modulators to encode this data onto the optical carriers.
5. The modulated optical signals may be directed back through the grating spectrometer (or through a second spectrometer) to output optical fibers.
6. The multiplexed signals may be transmitted to other processor chips in the network.
7. Simultaneously, multiplexed signals from other processor chips may be received, demultiplexed by the detector array spectrometer, and converted to electronic signals for processing by the chip.

This bidirectional, non-blocking broadband connection between networked devices may enable high-bandwidth, low-latency communication with significantly improved energy efficiency compared to traditional copper interconnects.

Applications and Benefits

The WDM optical interconnect system may be particularly beneficial for:

1. High-performance computing environments where massive data transfer between processors is required.
2. Data centers facing thermal and bandwidth limitations with traditional copper interconnects.
3. Deep learning applications that benefit from expanded interconnected device populations.
4. Any computing environment where the energy efficiency of interconnects is a critical concern.
5. Reconfiguring signal paths in a processor network.

The effectiveness of deep learning software may be enhanced by expansion of interconnected devices and awarding increased bandwidth and network device population to successful network subsets when the subsets show signs of progress toward a defined goal.

The system may provide several key benefits:

1. Increased bandwidth: The system may scale from 400 Gbps to hundreds of Tbps, depending on the number of wavelengths (N) and optical fibers (M).
2. Improved energy efficiency: Optical interconnects may require less energy per bit compared to copper interconnects, reducing the thermal load on the system.
3. Scalability: The system may support massive scaling through various network topologies, including multi-stage expansion where the number of interconnected devices may grow exponentially.
4. Reduced latency: Direct optical connections between processors may minimize communication delays, improving overall system performance.
5. Flexibility: The system may support various real time reconfigurable network topologies, allowing for optimization based on specific application requirements.

The present disclosure is not limited to the specifically disclosed embodiments, and variations and modifications may be made without departing from the scope of the present disclosure. As demonstrated in the preceding sections, the wavelength division multiplexing (WDM) optical interconnect system provides a revolutionary approach to processor interconnection through the integration of optical components directly within processor chips. The system may overcome traditional bandwidth and thermal limitations of copper interconnects while enabling massively parallel data transmission through a novel two-dimensional optical array architecture.

The system may leverage frequency comb generation, spectrometer-based wavelength multiplexing/demultiplexing, and integrated optical modulators to achieve aggregate throughputs ranging from hundreds of gigabits to hundreds of terabits per second. This scalability may be achieved through the combination of wavelength division (N channels) and spatial division (M layers), creating an M×N array of optical channels that can be individually modulated.

Various network topologies may be supported by this technology, including hub-and-spoke configurations for centralized processing, mesh networks for direct processor-to-processor communication, and hierarchical multi-stage architectures that may enable exponential scaling of interconnected devices. These flexible topologies may allow the system to be optimized for specific application requirements, from high-performance computing to deep learning environments.

The modularity of the system may allow for different implementations of key components. The frequency comb generator may utilize Lithium Niobate or $Si_3N_4$ material systems. The optical spectrometer may be implemented with traditional lens-grating-lens configurations or alternative Offner arrangements using curved mirrors. The modulators may be based on Lithium Niobate waveguide loops, Mach-Zehnder interferometers, resonant microdisks, or electro-absorption technology, depending on specific performance and integration requirements.

By moving optical interfaces from chip edges to the interior and utilizing the full three-dimensional volume of the chip, the WDM optical interconnect system may significantly increase the number of addressable modulators compared to traditional two-dimensional approaches. This three-dimensional integration, combined with the inherent advantages of optical transmission over copper, may provide a path forward for computing architectures that require ever-increasing bandwidth and processing capabilities while maintaining manageable power consumption and thermal profiles.

The WDM optical interconnect system may represent a significant advancement in the field of computer networking and may enable the next generation of high-performance computing systems, data centers, and artificial intelligence platforms through its innovative approach to optical signal processing and massive parallelism.

While aspects of the present invention can be described and claimed in a particular statutory class, such as the system statutory class, this is for convenience only and one of skill in the art will understand that each aspect of the present invention can be described and claimed in any statutory class. Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way appreciably intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

Throughout this application, various publications can be referenced. The disclosures of these publications in their entirety are hereby incorporated by reference into this application in order to more fully describe the state of the art to which this pertains. The references disclosed are also individually and specifically incorporated by reference herein for the material contained in them that is discussed in the sentence in which the reference is relied upon. Nothing herein is to be construed as an admission that the present invention is not entitled to antedate such publication by virtue of prior invention. Further, the dates of publication provided herein can be different from the actual publication dates, which can require independent confirmation.

The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as examples for embodiments of the disclosure.

Insofar as the description above and the accompanying drawing disclose any additional subject matter that is not within the scope of the claims below, the disclosures are not dedicated to the public and the right to file one or more applications to claims such additional disclosures is reserved. Although very narrow claims are presented herein, it should be recognized the scope of this disclosure is much broader than presented by the claims. It is intended that broader claims will be submitted in an application that claims the benefit of priority from this application.

What is claimed is:

1. A wavelength division multiplexing (WDM) optical interconnect system comprising:

a frequency comb generator configured to generate multiple optical wavelengths;

a demultiplexing optical spectrometer configured to separate the multiple optical wavelengths;

a processor chip comprising a plurality of optical waveguides and modulators, wherein the optical waveguides are configured to direct individual optical signals to the modulators, wherein the modulators are internal to and integral with the processor chip, wherein the modulators are arranged throughout a three-dimensional volume of the processor chip, and wherein the optical waveguides have a cross-sectional dimension substantially smaller than a cross-sectional dimension of the modulators, whereby a number of waveguides accessible on an area of the processor chip edge is comparable to a number of modulators contained in the three-dimensional volume of the processor chip; and output waveguides configured to direct modulated optical signals to separate networked devices.

2. The optical interconnect system of claim 1, wherein the demultiplexing optical spectrometer comprises:

an input for receiving optical signals;

a collimating lens;

a diffraction grating; and an output focusing lens, wherein the input for receiving optical signals is arranged in a two-dimensional array, and wherein the diffraction grating is configured to direct multiplexed wavelengths embedded in each input optical signal to a linear array of single-wavelength optical signals.

3. The optical interconnect system of claim 2, wherein the demultiplexing optical spectrometer is configured to function as a multiplexer by directing light in a direction opposite to a demultiplexing direction.

4. The optical interconnect system of claim 3, wherein the demultiplexing optical spectrometer comprises:

an input curved reflecting mirror;

a diffraction grating; and an output curved reflecting mirror in an Offner configuration.

5. The optical interconnect system of claim 2, wherein the frequency comb generator comprises Lithium Niobate (LN) as a comb generation material.

6. The optical interconnect system of claim 2, wherein the frequency comb generator comprises $Si_3N_4$ as a comb generation material.

7. The optical interconnect system of claim 1, further comprising:

a multiplexing optical spectrometer configured to combine the modulated optical signals from the output waveguides for transmission to the separate networked devices.

8. The optical interconnect system of claim 7, further comprising:

an input waveguide configured to receive wavelength-multiplexed optical signals;

wherein the demultiplexing optical spectrometer is configured to separate the wavelength-multiplexed optical signals into individual wavelengths; and a detector array configured to convert the individual wavelengths into electronic signals.

9. The optical interconnect system of claim 8, further comprising optical fibers configured to carry optical signals between the optical spectrometers and the networked devices.

10. The optical interconnect system of claim 8, wherein the demultiplexing optical spectrometer comprises:

an input collimating lens;

a diffraction grating; and an output focusing lens.

11. The optical interconnect system of claim 8, further comprising:

a plurality of optical input layers, wherein the demultiplexing optical spectrometer is configured to operate on all of the plurality of optical input layers simultaneously to produce a two-dimensional array of demultiplexed wavelengths input to the optical waveguides.

12. The optical interconnect system of claim 8, wherein:

the frequency comb generator produces a dense frequency output;

the frequency comb generator is coupled to one or more Mach-Zehnder interferometers configured to separate alternate frequencies into separate output waveguides; and the separate output waveguides are input to the demultiplexing optical spectrometer in an alignment that results in all of the original comb frequencies output in a single line into modulator waveguide ports.

13. A method for optical interconnection comprising:

generating multiple optical wavelengths using a frequency comb generator;

demultiplexing the multiple optical wavelengths using an optical spectrometer, wherein demultiplexing comprises:

receiving optical signals at an input arranged in a two-dimensional array;

collimating the optical signals;

diffracting the collimated optical signals;

focusing the diffracted optical signals to produce a linear array of single-wavelength optical signals;

directing individual optical wavelengths to modulators that are internal to and integral with a processor chip, wherein the modulators are arranged throughout a three-dimensional volume of the processor chip;

modulating the individual optical wavelengths based on electronic data from the processor chip;

multiplexing the modulated optical wavelengths; and transmitting the multiplexed optical wavelengths to networked devices.

14. The method of claim 13, further comprising:

receiving wavelength-multiplexed optical signals from the networked devices;

separating the wavelength-multiplexed optical signals into individual wavelengths;

converting the individual wavelengths into electronic signals using a detector array; and real-time reconfiguration of signal routing among networked devices by individual processors rerouting electronic signals internally.

15. A network comprising:

a plurality of optical interconnect systems, each optical interconnect system comprising:

a frequency comb generator configured to generate multiple optical wavelengths;

a demultiplexing optical spectrometer configured to separate the multiple optical wavelengths;

a processor chip comprising a plurality of optical waveguides and modulators, wherein the optical waveguides are configured to direct individual optical signals to the modulators, wherein the modulators are internal to and integral with the processor chip, and wherein the modulators are arranged throughout a three-dimensional volume of the processor chip; and output waveguides configured to direct modulated optical signals to separate networked devices, wherein the modulated optical signals are transmitted bidirectionally in successive stages from a hub to a plurality of spokes, and wherein each spoke transmits optical signals bidirectionally to a plurality of further spokes.

16. The network of claim 15, wherein A represents a number of successive hub-and-spoke transmission stages and B represents a number of bidirectional optical signal transmissions from each hub node to connected spoke nodes, such that a number of interconnected devices scales up to B raised to the power A.

17. The network of claim 16, wherein the modulated optical signals are bidirectionally connected to separate devices in a hub and spoke topology; and wherein A is a nonzero integer in a range of 1 through 5, and wherein B is a nonzero integer in a range of from 4 to 320.

18. The network of claim 15, wherein the modulated optical signals are bidirectionally connected to separate devices in a mesh topology.

* * * * *